(12) United States Patent
Nakajima et al.

(10) Patent No.: US 10,914,015 B2
(45) Date of Patent: Feb. 9, 2021

(54) STEEL CORD AND METHOD FOR PRODUCING THE SAME

(71) Applicants: SUMITOMO ELECTRIC TOCHIGI CO., LTD., Utsunomiya (JP); Sumitomo Electric Industries, Ltd., Osaka (JP); SUMITOMO RUBBER INDUSTRIES, LTD., Kobe (JP); NIPPON STEEL CORPORATION, Tokyo (JP)

(72) Inventors: Tetsuya Nakajima, Utsunomiya (JP); Kenichi Yamashita, Utsunomiya (JP); Takashi Tokuyama, Utsunomiya (JP); Shinei Takamura, Itami (JP); Masumi Suzuki, Kobe (JP); Koji Fujisawa, Kobe (JP); Junichi Kodama, Tokyo (JP)

(73) Assignees: Sumitomo Electric Tochigi Co., Ltd., Utsunomiya (JP); Sumitomo Electric Industries, Ltd., Osaka (JP); Sumitomo Rubber Industries, Ltd., Kobe (JP); Nippon Steel Corporation, Tokyo (JP)

( * ) Notice: Subject to any disclaimer, the term of this patent is extended or adjusted under 35 U.S.C. 154(b) by 316 days.

(21) Appl. No.: 15/768,728

(22) PCT Filed: Oct. 13, 2016

(86) PCT No.: PCT/JP2016/080448
§ 371 (c)(1),
(2) Date: Apr. 16, 2018

(87) PCT Pub. No.: WO2017/065242
PCT Pub. Date: Apr. 20, 2017

(65) Prior Publication Data
US 2018/0266000 A1 Sep. 20, 2018

(30) Foreign Application Priority Data

Oct. 16, 2015 (JP) .................................. 2015-204894

(51) Int. Cl.
*C25D 5/10* (2006.01)
*C25D 5/50* (2006.01)
(Continued)

(52) U.S. Cl.
CPC .............. *C25D 5/10* (2013.01); *B60C 9/0007* (2013.01); *C21D 8/065* (2013.01); *C21D 9/525* (2013.01);
(Continued)

(58) Field of Classification Search
CPC ........ C25D 5/10; B60C 9/0007; C21D 8/065; C21D 9/525; C23F 17/00
See application file for complete search history.

(56) References Cited

U.S. PATENT DOCUMENTS 4,255,496 A * 3/1981 Haemers ................. C23C 30/00
428/677
4,347,290 A 8/1982 Haemers
(Continued)

FOREIGN PATENT DOCUMENTS

GB 2076320 A 12/1981
JP S57-056110 A 4/1982
(Continued)

OTHER PUBLICATIONS

Consideration and improved quality—of <process, type, and purpose exception> plating state-of-the-art art-a mechanism, an incorporated company information mechanism, May 18, 2006, 1st printing, p. 11 [Cited in Notification of Reasons for Refusal issued in counterpart Japanese Patent Application No. 2015-204894 dated Dec. 18, 2018].

*Primary Examiner* — Christopher S Kessler
*Assistant Examiner* — Jiangtian Xu (74) *Attorney, Agent, or Firm* — Baker Botts L.L.P.; Michael A. Sartori (57) ABSTRACT

There is provided a steel cord including a steel wire and a plating layer that covers the steel wire and has Cu, Zn, and Co, wherein Cu and Zn are alloyed and a region covered with Co and a region not covered with Co are mixed on the outermost surface of the plating layer.

13 Claims, 4 Drawing Sheets

(51) Int. Cl.

| | | |
|---|---|---|
| *C25D 7/06* | (2006.01) | |
| *D07B 1/06* | (2006.01) | |
| *B60C 9/00* | (2006.01) | |
| *C21D 8/06* | (2006.01) | |
| *C21D 9/52* | (2006.01) | |
| *C23F 17/00* | (2006.01) | |
| *C25D 3/12* | (2006.01) | |
| *C25D 3/22* | (2006.01) | |
| *C25D 3/38* | (2006.01) | |
| *C25D 5/36* | (2006.01) | |

(52) U.S. Cl.
CPC ............... *C23F 17/00* (2013.01); *C25D 3/12* (2013.01); *C25D 3/22* (2013.01); *C25D 3/38* (2013.01); *C25D 5/36* (2013.01); *C25D 5/50* (2013.01); *C25D 7/06* (2013.01); *C25D 7/0607* (2013.01); *D07B 1/06* (2013.01); *D07B 1/0666* (2013.01); *B60C 9/00* (2013.01); *B60C 2009/0014* (2013.01); *D07B 2205/3025* (2013.01); *D07B 2205/3067* (2013.01); *D07B 2205/3071* (2013.01); *D07B 2205/3089* (2013.01); *D07B 2501/2046* (2013.01); *D10B 2505/12* (2013.01)

(56) References Cited

U.S. PATENT DOCUMENTS

| | | |
|---|---|---|
| 2002/0088522 A1 | 7/2002 | Uchino et al. |
| 2012/0177944 A1 | 7/2012 | Toyosawa |

FOREIGN PATENT DOCUMENTS

| | | |
|---|---|---|
| JP | H01-098632 A | 4/1989 |
| JP | H01-177390 A | 7/1989 |
| JP | H05-247271 A | 9/1993 |
| JP | 2002-013085 A | 1/2002 |
| KR | 101508683 B1 | 4/2015 |
| WO | 2011030547 A1 | 3/2011 |

\* cited by examiner

STEEL CORD AND METHOD FOR PRODUCING THE SAME

TECHNICAL FIELD

The present invention relates to a steel cord and a method for producing the same.

BACKGROUND ART

In Patent Document 1 and the like, a steel cord to be used in tires for automobiles is known. Patent Document 1 proposes a technique of improving initial adhesiveness by incorporating Co into a surface layer region of the steel cord.

BACKGROUND ART DOCUMENTS

Patent Documents

Patent Document 1: JP-A-2002-13085

SUMMARY OF THE INVENTION

Problems that the Invention is to Solve

For the steel cord as described in Patent Document 1, in addition to the initial adhesiveness to rubber, moist heat resistance is required. When high temperature repeatedly acts on a tire, moisture, the rubber, and the steel cord react to lower adhesive strength between the rubber and the steel cord. Durability against aged deterioration caused by the repeatedly acting moisture and heat is called moist heat resistance.

The present invention relates to a steel cord excellent in both of the initial adhesiveness and the moist heat resistance.

Means for Solving the Problems

According to the present invention,
there is provided a steel cord comprising a steel wire and a plating layer that covers the steel wire and has Cu, Zn, and Co, wherein
the Cu and the Zn are alloyed and
a region covered with Co and a region not covered with Co are mixed on the outermost surface of the plating layer.
Moreover, according to the invention,
there is provided a method for producing a steel cord comprising a plating layer that has Cu, Co, and Zn, which comprises:
a first plating step of plating the Cu to a steel wire,
a second plating step of plating the Co and the Zn on the Cu to obtain a plated wire, and
a wire-drawing step of drawing the plated wire to obtain a steel cord, wherein
after the wire-drawing step, a region covered with Co and a region not covered with Co are mixed in the surface of the steel cord.

Advantage of the Invention

According to the present invention, there are provided a steel cord excellent in both of initial adhesiveness and moist heat resistance and a method for producing the same.

MODES FOR CARRYING OUT THE INVENTION

Summary of Embodiments of the Invention

First, summary of the embodiments of the present invention will be described.

(1) One embodiment of the steel cord according to the invention comprises a steel wire and a plating layer that covers the steel wire and has Cu, Zn, and Co, wherein
the Cu and the Zn are alloyed and
a region covered with Co and a region not covered with Co are mixed on the outermost surface of the plating layer.

(2) In the steel cord according to the embodiment,
the ratio of the area of the region covered with Co to the area of the region not covered with Co may be a range from 2:98 to 30:70.

(3) In the steel cord according to the embodiment,
the content of Co in the plating layer may be a range from 2 to 8 wt %.

(4) In the steel cord according to the embodiment,
in at least a part of the region not covered with Co, Co may not be present between the outermost surface of the plating layer and an interface with the steel wire.

(5) In the steel cord according to the embodiment,
in a plan view of the plating layer, at least a part of the region covered with Co may be present in an island shape on the outermost surface of the plating layer.

(6) In the steel cord according to the embodiment,
in a sectional view of the steel cord, Co may be present at a position apart from the steel wire.

(7) One embodiment of the tire according to the present invention is a tire comprising the steel cord according to any of the (1) to (6).

(8) One embodiment of the method for producing a steel cord according to the present invention is a method for producing a steel cord comprising a plating layer that has Cu, Co, and Zn, which comprises:
a first plating step of plating the Cu to a steel wire,
a second plating step of plating the Co and the Zn on the Cu to obtain a plated wire, and
a wire-drawing step of drawing the plated wire to obtain a steel cord, wherein
after the wire-drawing step, a region covered with Co and a region not covered with Co are mixed on the surface of the steel cord.

(9) In the method for producing a steel cord according to the embodiment,
a region where the Zn comes into direct contact with the Cu may be formed in the second plating step.

(10) In the method for producing a steel cord according to the embodiment, after the second plating step, a heat treatment may be performed at a temperature equal to or higher than alloying temperature of the above Cu and the above Zn to expose a part of the above Co on the surface of the plated wire.

(11) In the method for producing a steel cord according to the above embodiment, the heat treatment may be performed at a temperature equal to or higher than the temperature at which Zn becomes a liquid phase.

(12) In the method for producing a steel cord according to the above embodiment, in the second plating step, the above Zn may be plated after the above Co is plated.

Details of Embodiments of the Invention

The following will describe examples of embodiments of the steel cord and the method for producing the same according to the present invention, with reference to drawings. Incidentally, it is intended that the invention should not be construed as being limited to these examples and includes all changes shown by Claims or falling within meanings and scopes equivalent to Claims.

Figure 1:
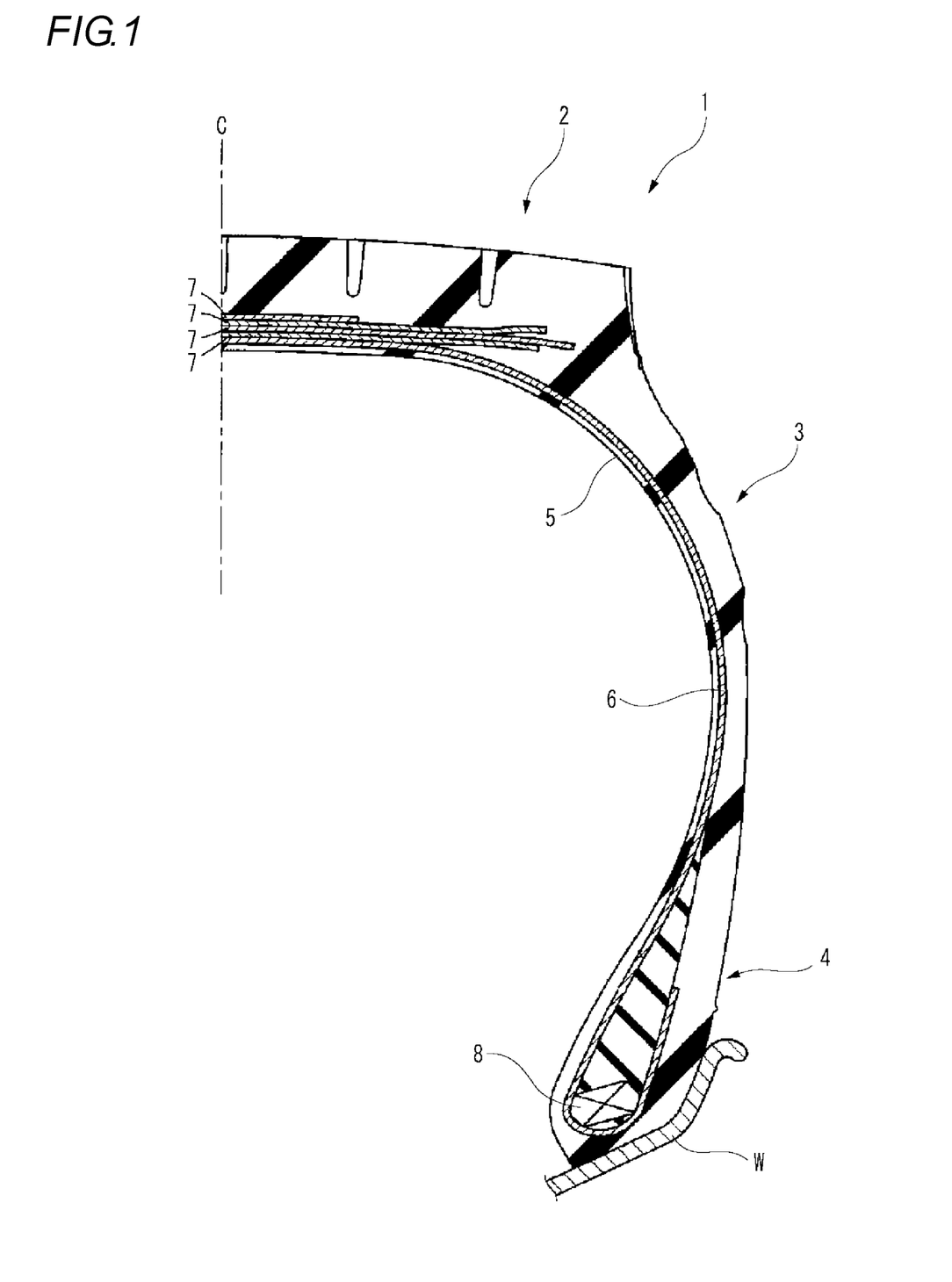
FIG. 1 is a cross-sectional view of a tire for automobiles using a steel cord according to an embodiment of the present invention.

FIG. 1 is a cross-sectional view of a tire 1 containing a steel cord 10 according to an embodiment of the invention. As shown in FIG. 1, the tire 1 comprises a tread part 2, a sidewall part 3, and a bead part 4.

The tread part 2 is a part that comes into contact with a road surface. The bead part 4 is disposed on an inner diameter side relative to the tread part 2. The bead part 4 is a part that comes into contact with a rim of a wheel W of a vehicle. The sidewall part 3 connects the tread part 2 and the bead part 4. When the tread part 2 receives impact from a road surface, the sidewall part 3 elastically deforms to absorb the impact.

Moreover, the tire 1 comprises an inner liner 5, a carcass 6, a belt 7, and a bead wire 8.

The inner liner 5 is composed of rubber and tightly closes a space between the tire 1 and the wheel W.

The carcass 6 forms a skeleton of the tire 1. The carcass is composed of an organic fiber such as polyester, nylon, or rayon and rubber.

The belt 7 fastens the carcass 6 to increase rigidity of the tread part 2. The belt 7 is composed of a steel cord 10 and rubber. In the example shown in the figure, the tire 1 has four layers of the belt 7.

The bead wire 8 is disposed in the bead part 4. The bead wire 8 is one obtained by twisting steel wires together and covering them with rubber. The bead wire 8 receives a tensile force that acts on the carcass 6.

The steel cord 10 of the present embodiment is a member constituting the belt 7. For the steel cord 10, initial adhesiveness to rubber such as butadiene rubber and moist heat resistance are required.

When rubber is topped on the steel cord 10 and subjected to a crosslinking reaction, the rubber closely adhered to the steel cord 10. The adhesive strength between the rubber and the steel cord 10 when the crosslinking reaction is accomplished is called initial adhesiveness.

At the time of using the tire 1, the moisture that has entered into the tire 1 acts on the steel cord 10 and the rubber to gradually lower the adhesive strength between the steel cord 10 and the rubber. Particularly, in the case where the tire 1 is used in a high-temperature and high-humidity area, there is a concern that the high temperature and the high humidity repeatedly act on the tire 1 to promote the lowering of the adhesive strength between the steel cord 10 and the rubber. Such deterioration of the adhesive strength increases with time and is promoted under a high-temperature and high-humidity environment.

Durability against the lowering of the adhesive strength caused by the repeatedly acting heat and moisture is called moist heat resistance.

Figure 6:
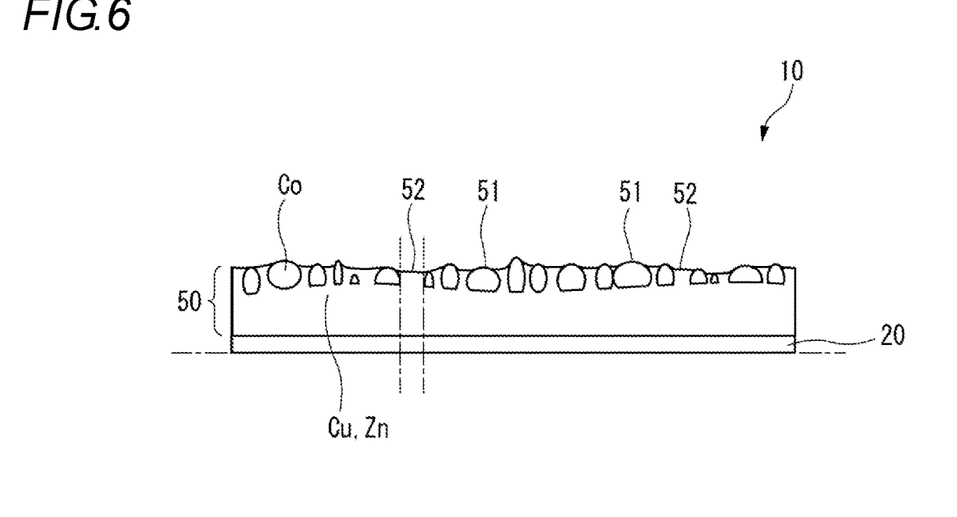
FIG. 6 is a cross-sectional view of a steel cord according to an embodiment of the present invention.

FIG. 6 is a cross-sectional view showing a steel cord 10 according to the present embodiment. As shown in FIG. 6, the steel cord 10 according to the present embodiment comprises a steel wire 20 and a plating layer 50 provided on the outer periphery of the steel wire 20. The plating layer 50 contains Cu, Co, and Zn. Cu and Zn are alloyed. On the outermost surface of the plating layer 50, a region 51 covered with Co and a region 52 not covered with Co are mixed.

In the plating layer 50, Co is not alloyed and present. Here, the phrase "Co is not alloyed" means that at least a proportion of Co not alloyed is 95 wt % or more relative to Co present on the outermost surface of the plating layer 50. Moreover, the proportion of Co not alloyed is preferably 99 wt % or more. Incidentally, Co may be contained in a layer lower than the outermost surface of the plating layer 50.

Next, the method for producing the steel cord 10 will be described using FIG. 2 to FIG. 6. FIG. 2 to FIG. 5 are views showing a production process of the steel cord 10 and show cross sections.

Figure 2:
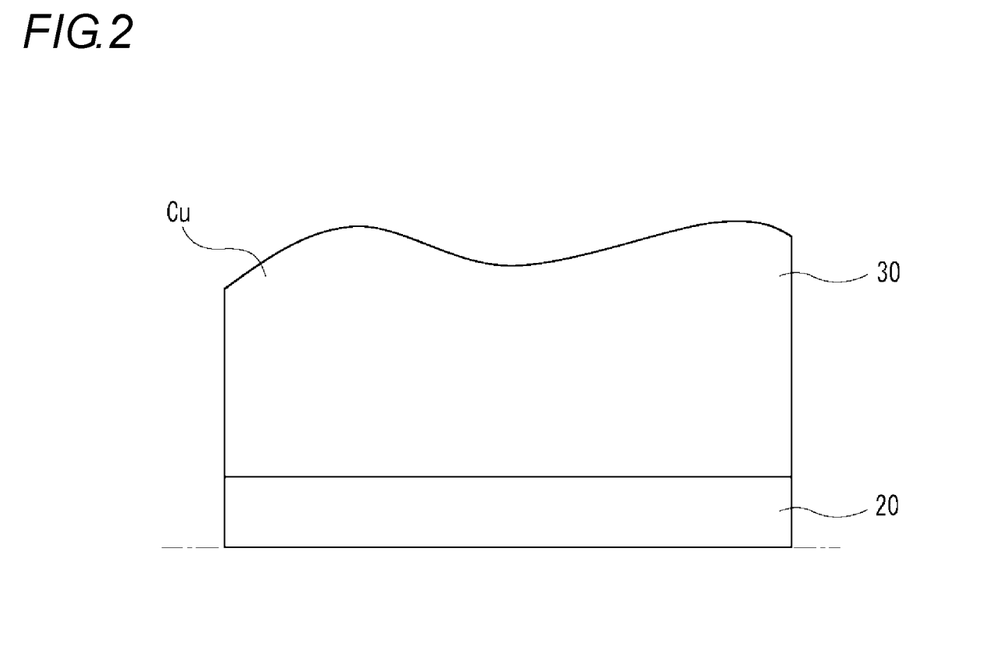
FIG. 2 is a view showing a production step of a steel cord according to an embodiment of the present invention.

First, as shown in FIG. 2, the steel wire 20 is prepared and Cu is plated on the steel wire 20 to form a first layer 30 (first plating step).

Figure 3:
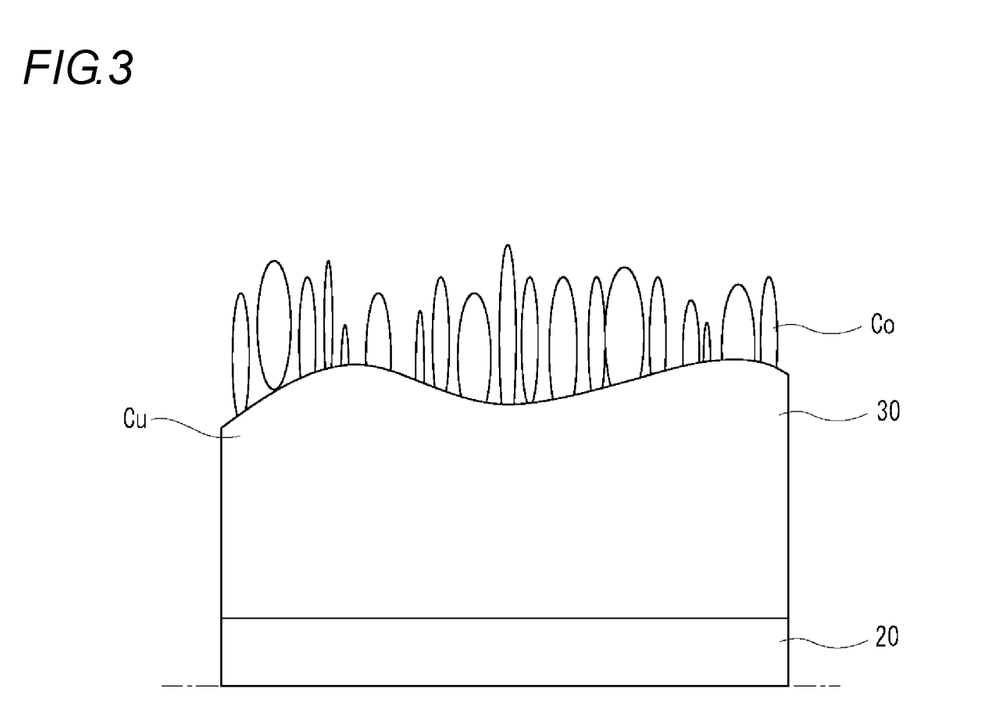
FIG. 3 is a view showing a production step of a steel cord according to an embodiment of the present invention.
Figure 4:
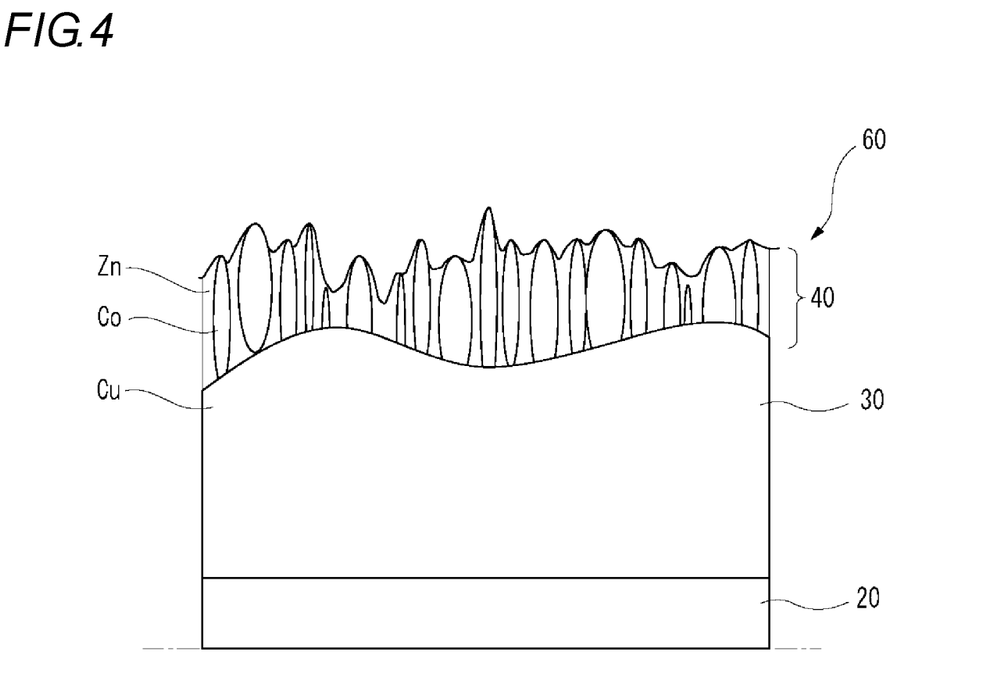
FIG. 4 is a view showing a production step of a steel cord according to an embodiment of the present invention.

Then, as shown in FIG. 3 and FIG. 4, Co and Zn are plated on the first layer 30 to form a second layer 40, thereby obtaining a plated wire 60 (second plating step). In the second plating step, in the present embodiment, Co is first plated on the first layer and then Zn is plated. As shown in FIG. 4, Zn is plated so as to enter into spaces among Co particles that are discretely formed. Zn is preferably plated so as to form a region where Zn comes into direct contact with Cu. Incidentally, in FIG. 3 to FIG. 6, Co is depicted in an amount larger than the actual amount thereof so as to make it easy to see.

In the step of plating metal(s) including Co, as shown in FIG. 3, plating can be performed so that Co is unevenly present by controlling plating conditions. For example, by controlling the current value at which current is supplied to the plating tank, the linear velocity of the steel wire 20 which is allowed to pass through the plating tank, the composition of the plating solution, and the like, plating can be achieved so that Co is unevenly present. Alternatively, by performing plating while bubbles are generated in the plating tank or using a method of porous plating, plating can be performed so that Co is unevenly present. Also, by plating Co after a pretreatment such as acid washing is performed on the steel wire 20 or on the steel wire on which Cu has been plated so that a portion at which seeds are prone to form and a portion at which seeds are less prone to form are made, plating can be achieved so that Co is unevenly present.

After the second plating step, the plated wire 60 is subjected to a heat treatment. The temperature of the heat treatment is a temperature equal to or higher than the alloying temperature of Cu and Zn. The temperature of the heat treatment is preferably 550° C. or higher and 650° C. or lower that is higher than the melting point (419.5° C.) at which Zn becomes a liquid phase. The time of the heat treatment is preferably 3 seconds or more and 7 seconds or less.

Figure 5:
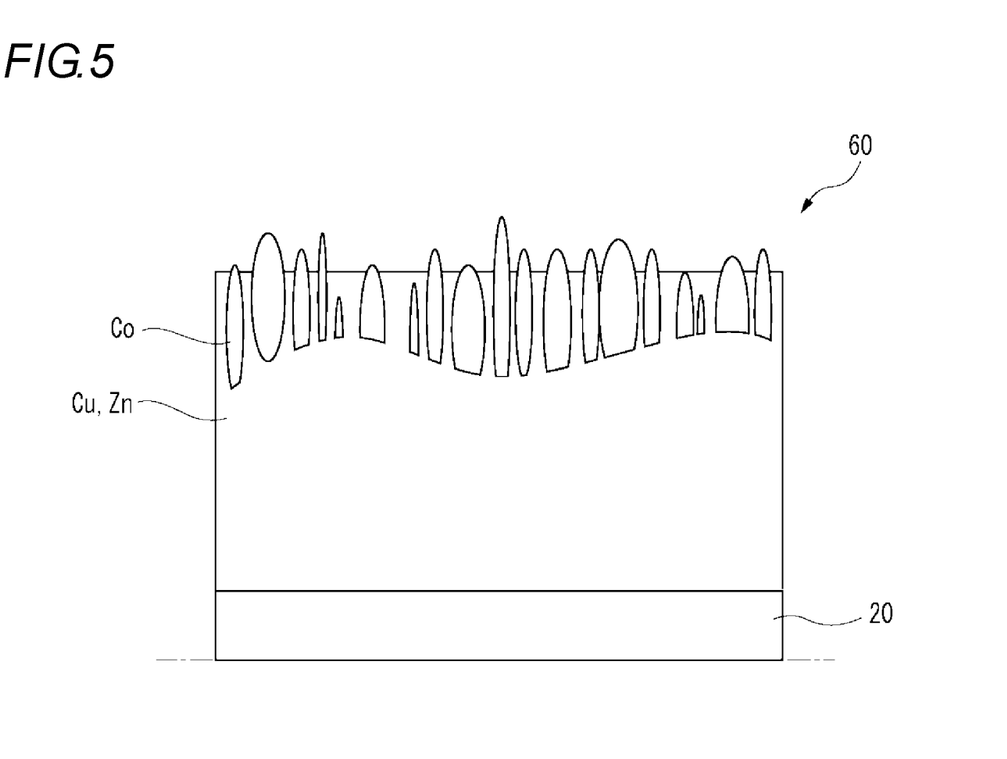
FIG. 5 is a view showing a production step of a steel cord according to an embodiment of the present invention.

By the heat treatment, as shown in FIG. 5, Cu and Zn are alloyed to be brass. Moreover, by the heat treatment, brass spreads over the surface of the plated wire 60 and a part of Co can be exposed on the surface of the plated wire 60 or, by the heat treatment, the area of Co exposed on the surface of the plated wire 60 can be widened. However, unlike FIG. 5, there may be a state that Co is not exposed on the surface of the plated wire 60 by the heat treatment and the surface of the plated wire 60 is cover with brass alone.

Next, the plated wire 60 obtained in FIG. 5 is subjected to wire-drawing processing. Then, as shown in FIG. 6, there is obtained the steel cord 10 where a region 51 covered with Co and a region 52 not covered with Co are mixed on the surface of the steel cord 10. At this time, when a heat treatment is performed before the wire-drawing processing to expose at least a part of Co on the outermost surface, the area of Co exposed on the outermost surface can be widened in the case where the wire-drawing processing is performed.

Incidentally, even when Co is not exposed on the surface of the plated wire 60, by appropriately setting the conditions for the wire-drawing processing, the brass on the outermost surface of the plated wire 60 is scraped away to expose Co and thus there can be obtained the steel cord 10 where the region 51 covered with Co and the region 52 not covered with Co are mixed on the outermost surface.

In the aforementioned embodiment, there is described a method of plating Cu, Co, and Zn in this order but the present invention is not limited thereto. After Cu is plated, Zn and Co can be plated in this order. Alternatively, after Cu is plated, Zn and Co can be simultaneously plated using a plating solution containing both of Zn and Co.

However, as mentioned above, it is preferred to plate Cu, Co, and Zn in this order. At the time of the wire-drawing processing, when Co is present on the outermost surface, Co is scraped away by a mold and Co will be wasted. Therefore, in order to excessively widen the region of exposed Co at the time of the wire-drawing processing, it is preferred to plate Cu, Co, and Zn in this order.

As above, according to the steel cord 10 of the present embodiment, the region 51 covered with Co and the region 52 not covered with Co are mixed on the surface of the steel cord 10. The present inventors have found that such a steel cord 10 is particularly excellent in the initial adhesiveness and the moist heat resistance as a result of comparing the following Examples and Comparative Examples. It is presumed that the initial adhesiveness and the moist heat resistance are both achieved because Co and Zn are mixed in an appropriate ratio at the interface between the rubber and the steel cord 10.

On the outermost surface of the plating layer 50, the ratio of the area of the region 51 covered with Co to the area of the region 52 not covered with Co is a range from 2:98 to 30:70. When the region 51 covered with Co is too small, the moist heat resistance cannot be enhanced. When the region 52 not covered with Co is too small, the initial adhesiveness cannot be enhanced.

Incidentally, the ratio of the area of the region 51 covered with Co to the area of the region 52 not covered with Co is preferably a range from 4:96 to 20:80. The ratio of the area of the region 51 covered with Co to the area of the region 52 not covered with Co is more preferably a range from 8:92 to 15:85.

In the present embodiment, the content of Co in the plating layer 50 is a range from 2 to 8 wt %. When Co is too little, the moist heat resistance of the rubber and the plating layer 50 cannot be enhanced. When Co is too much, since the region 52 not covered with Co is less prone to be formed, the initial adhesiveness cannot be sufficiently secured.

As shown in FIG. 6, in at least a part of the region 52 not covered with Co, Co is preferably not present between the outermost surface of the plating layer 50 and the interface with the steel wire 20. In FIG. 6, as shown by the region sandwiched by two 2-dot chain lines, Co is preferably not present in the region from the region 52 not covered with Co until the interface with the steel wire 20 toward the depth direction (inside in the diameter direction).

Moreover, as shown in FIG. 6, in a sectional view of the steel cord 10, Co is preferably present at a position apart from the steel wire 20. As compared with the case where Co is buried in the plating layer 50, the moist heat resistance of the steel cord 10 can be effectively enhanced with a smaller amount of Co.

In a plan view of the plating layer 50, at least a part of the region 51 covered with Co is preferably present in an island shape on the outermost surface of the plating layer 50. Since the periphery of the region 51 covered with Co in an island shape is surrounded with the region 52 not covered with Co, both of the initial adhesiveness and the moist heat resistance are prone to be enhanced. The island shape herein refers to a state that the region 51 covered with Co is collected one while having a certain degree of area. The region 51 covered with Co may be a circular shape, a linear shape, a rectangular shape, a star shape, a polygonal shape, an elliptic shape, and the like. The region 51 covered with Co and the other region 51 covered with Co are separated by the region 52 not covered with Co.

Incidentally, on the surface of the steel cord, at the time of the wire-drawing processing, the region covered with Co and the region not covered with Co may be made mixed or, before the wire-drawing processing, the region covered with Co and the region not covered with Co may be made mixed.

Figure 7:
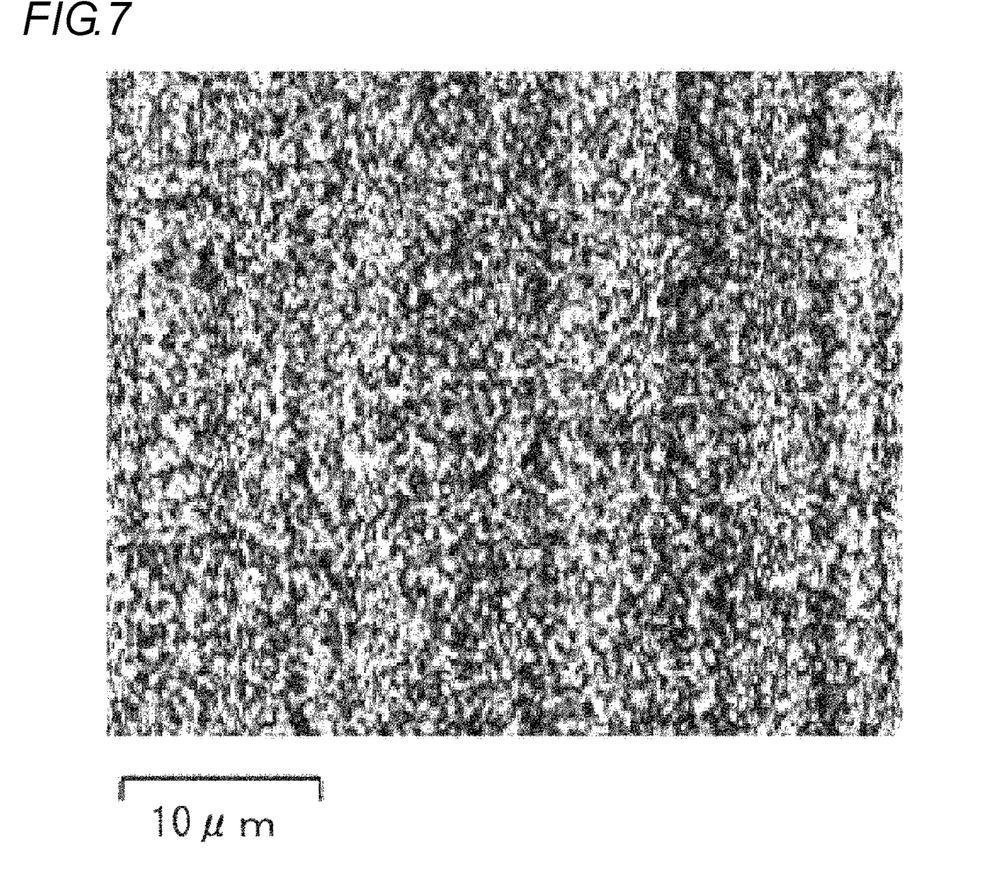
FIG. 7 is a view showing Co on the outermost surface of a steel cord according to the present embodiment, which is measured by EDX.

FIG. 7 is a view showing Co on the outermost surface of the steel cord 10 according to the present embodiment, which is measured by an energy dispersive X-ray spectroscopic analyzer (EDX: Energy Dispersive X-ray Spectroscopy). FIG. 7 is one analyzed by X-Max80Premium of Oxford Company at an acceleration voltage of 3 kV. As shown in FIG. 7, in the present embodiment, it was confirmed that the region 51 covered with Co and the region 52 not covered with Co were mixed on the surface of the steel cord 10. Incidentally, in FIG. 7, the region 51 covered with Co appears white and the region 52 not covered with Co appears black.

The present inventors have manufactured steel cords of Examples 1 to 4 and Comparative Examples 1 and 2 with changing the order of plating and conditions for Co plating as shown in Table 1 and evaluated on wire-drawing processability, initial adhesiveness to rubber, and moist heat resistance with rubber.

TABLE 1

| | | Conditions for Co plating | | | | Heat treatment | |
| --- | --- | --- | --- | --- | --- | --- | --- |
| Order of plating | Amount of plated Co | Current density [A/dm$^2$] | Plating solution [pH] | Plating time [second] | | Temperature [° C.] | Time [s] |

TABLE 1-continued

| | | | | | | | |
|---|---|---|---|---|---|---|---|
| Example 1 | Cu→Co→Zn | small | 7 | 2.5 | 1 | 550 to 650 | 5 |
| Example 2 | Cu→Co→Zn | medium (suitable) | 28 | 2.5 | 1 | 550 to 650 | 5 |
| Example 3 | Cu→Co→Zn | large | 56 | 2.5 | 1 | 550 to 650 | 5 |
| Example 4 | Cu→Zn + Co (eutectoid plating) | medium | 33 | 2.5 | 4 | 550 to 650 | 5 |
| Comparative Example 1 | Cu→Co→Zn | large | 70 | 2.5 | 1 | 550 to 650 | 5 |
| Comparative Example 2 | Cu→Zn | no | — | — | — | 550 to 650 | 5 |

| | Wire-drawing processability | Initial adhesiveness | Moist heat resistance | Adhesiveness judgment |
|---|---|---|---|---|
| Example 1 | A | 9.0 | 6.0 | OK |
| Example 2 | A to B (slowing down, no wire break) | 9.5 | 9.0 | OK |
| Example 3 | B | 7.0 | 7.5 | OK |
| Example 4 | B | 8.0 | 6.0 | OK |
| Comparative Example 1 | C | 2.0 | 2.0 | NG |
| Comparative Example 2 | A | 10.0 | 3.0 | NG |

EXAMPLE 1

As a steel wire, a piano wire of SWRS80A (80C material) was used. A steel wire of 5.5 mmφ was subjected to a surface treatment of acid washing. Then, the steel wire was subjected to rough wire-drawing processing so as to be 1.4 mmφ. Thereafter, Cu, Co, and Zn were plated in this order. As conditions for Co plating at this time, current density was set at 7 A/dm$^2$, pH of the plating solution was set at 2.5, and plating time (time during which the steel wire is immersed in a plating solution) was set at 1.0 second. Furthermore, the temperature in the oven was set at 550 to 600° C. and a heat treatment was performed for 5 seconds.

EXAMPLE 2

A steel cord according to Example 2 was manufactured while changing the conditions for Co plating alone from those in Example 1. In Example 2, as conditions for Co plating, current density was set at 28 A/dm$^2$, pH of the plating solution was set at 2.5, and plating time was set at 1.0 second. As a result, the amount of plated Co of the steel cord according to Example 2 was larger than the amount of plated Co in Example 1.

EXAMPLE 3

A steel cord according to Example 3 was manufactured while changing the conditions for Co plating alone from those in Example 1. In Example 3, as conditions for Co plating at this time, current density was set at 56 A/dm$^2$, pH of the plating solution was set at 2.5, and plating time was set at 1.0 second. As a result, the amount of plated Co of the steel cord according to Example 3 was larger than the amount of plated Co in Example 1. Moreover, the amount of plated Co of the steel cord according to Example 3 was larger than the amount of plated Co in Example 2.

EXAMPLE 4

In Example 4, after Cu was plated, Co and Zn were simultaneously plated using a plating solution containing Co and Zn. As conditions for Co plating, current density was set at 33 A/dm$^2$, pH of the plating solution was set at 2.5, and plating time was set at 4 seconds.

The amount of plated Co of the obtained steel cord was larger than that in Example 1 and smaller than that in Example 3.

Each of the plated wires 60 obtained under the plating conditions of Examples 1 to 4 was subjected to finishing wire-drawing processing to obtain a filament of 0.25 mmφ, and four filaments were twisted together to obtain a steel cord. In all the steel cords of Examples 1 to 4, a region covered with Co and a region not covered with Co were mixed on the outermost surface thereof.

COMPARATIVE EXAMPLE 1

In Comparative Example 1, after Cu was plated, Co was plated so that Co covered the surface of Cu without any clearance. Thereafter, Zn was plated on the surface of Co which had covered the surface of Cu without any clearance. As conditions for Co plating, current density was set at 70 A/dm$^2$, pH of the plating solution was set at 2.5, and plating time was set at 1 second.

When the plated wire 60 thus obtained was subjected to finishing wire-drawing processing to obtain a steel cord, only a region 51 covered with Co was present and a region 52 not covered with Co was not present.

COMPARATIVE EXAMPLE 2

Comparative Example 2 is a steel cord where only Zn was plated on Cu and Co was not plated. As a matter of course, only a region not covered with Co was present on the outermost surface of the steel cord.

<Evaluation>

For the steel cords according to Examples 1 to 4 and Comparative Examples 1 and 2 manufactured as mentioned above, wire-drawing processability, initial adhesiveness to rubber, and moist heat resistance with rubber were evaluated.

(Wire-Drawing Processability)

In the finishing wire-drawing processing of each of the steel cords obtained as mentioned above, easiness of the wire-drawing processing was evaluated in consideration of linear velocity (maximum linear velocity) at which the wire-drawing processing was stably possible and a degree of wire break.

A represents a case where the maximum linear velocity is large and wire break is less prone to occur.

C represents a case where the maximum linear velocity is small and wire break is prone to occur.

B represents a case where wire break is less prone to occur but the maximum linear velocity is small or the maximum linear velocity is large but wire break is prone to occur.

As shown in Table 1, in the case of the steel cord of Example 1, the maximum linear velocity was large and wire break was less prone to occur;

in the case of the steel cord of Example 2, the maximum linear velocity was smaller than that in Example 1 but wire break was not observed; and in the cases of the steel cords of Examples 3 and 4, the maximum linear velocity and difficulty in wire break were inferior to those in Example 1 but were within allowable ranges.

(Initial Adhesiveness)

As the initial adhesiveness, a steel cord was sandwiched with rubber and the rubber was peeled off after a vulcanization treatment. At this time, the state of the rubber attached on the surface of the steel cord was visually ranked in terms of evaluation of perfect 10.

As for the initial adhesiveness, Comparative Example 2 received 10 points and was most excellent. Examples 1 to 4 received 7 points or more and were excellent. Of these, Examples 1 and 2 received 9 points or more and were especially excellent. On the other hand, Comparative Example 1 received 2 points and thus the initial adhesiveness was not good. In Comparative Example 1, it is considered that, as a result of much exposure of Co on the surface of the steel cord, the initial adhesiveness to rubber was not enhanced.

(Moist Heat Resistance)

The moist heat resistance was evaluated as follows. Rubber was topped on each of the steel cords according to Examples 1 to 4 and Comparative Examples 1 and 2 obtained as mentioned above, subjected to a vulcanization treatment at a temperature of 150° C. under a pressure of 50 kg/cm$^2$ for 20 minutes, and further stored in a high-temperature and high-humidity state of a temperature of 80° C. and a humidity of 95% for 5 days. Thereafter, the rubber was peeled from the steel cord and adhesiveness was evaluated as 10 steps based on the state of the rubber attached to the outer periphery of the steel cord.

As shown in Table 1, the steel cords of Examples 1 to 4 received 6 points or more in view of the moist heat resistance and were excellent. On the other hand, those of Comparative Examples 1 and 2 received 3 points or less in view of the moist heat resistance and were inferior.

(Adhesiveness Judgment)

Those that showed a predetermined level or more in both of the initial adhesiveness and the moist heat resistance were judged OK and those that showed a level lower than a predetermined level in at least one of the initial adhesiveness and the moist heat resistance were judged NG. The steel cords according to Examples 1 to 4 showed a predetermined level or more in both of the initial adhesiveness and the moist heat resistance and were judged OK. The steel cords according to Comparative Examples 1 and 2 showed a level lower than a predetermined level in at least one of the initial adhesiveness and the moist heat resistance and were judged NG.

As evaluated above, it was confirmed that the steel cords according to Examples 1 to 4 had high characteristics in both of the initial adhesiveness and the moist heat resistance. Also, steel cords according to Examples 1 to 4 had high wire-drawing processability.

As compared to these, the steel cord according to Comparative Example 1 showed low initial adhesiveness and moist heat resistance. The steel cord according to Comparative Example 2 showed high initial adhesiveness but low moist heat resistance and thus could not achieve both of the initial adhesiveness and the moist heat resistance.

The present application is based on Japanese Patent Application No. 2015-204894 filed on Oct. 16, 2015, and the contents are incorporated herein by reference.

DESCRIPTION OF REFERENCE NUMERALS AND SIGNS

1 Tire
2 Tread part
3 Sidewall part
4 Bead part
5 Inner liner
6 Carcass
7 Belt
8 Bead wire
10 Steel cord
20 Steel wire
30 First layer
40 Second layer
50 Plating layer
51 Region covered with Co
52 Region not covered with Co
60 Plated wire

The invention claimed is:

1. A steel cord comprising a steel wire and a plating layer that covers the steel wire, wherein
    the plating layer has Cu, Zn, and Co,
    the Cu and the Zn are alloyed, and
    a region covered with Co which is in an island shape and is not alloyed and a region not covered with Co coexist in the outermost surface of the plating layer.

2. The steel cord according to claim 1, wherein the ratio of the area of the region covered with Co to the area of the region not covered with Co is a range from 2:98 to 30:70.

3. The steel cord according to claim 1, wherein the content of Co in the plating layer is a range from 2 to 8 wt %.

4. The steel cord according to claim 1, wherein, in at least a part of the region not covered with Co, Co is not present between the outermost surface of the plating layer and an interface with the steel wire.

5. The steel cord according to claim 1, wherein, in a plan view of the plating layer, at least a part of the region covered with Co is present in an island shape on the outermost surface of the plating layer.

6. The steel cord according to claim 1, wherein, in a sectional view of the steel cord, Co is present at a position apart from the steel wire.

7. A tire comprising the steel cord according to claim 1.

8. A method for producing a steel cord comprising a plating layer that has Cu, Co, and Zn, which comprises:
    a first plating step of plating the Cu to a steel wire,
    a second plating step of plating the Co and the Zn on the Cu to obtain a plated wire, and
    a wire-drawing step of drawing the plated wire to obtain a steel cord, wherein after the wire-drawing step, a region covered with Co which is in an island shape and is not alloyed and a region not covered with Co coexist in the surface of the steel cord.

9. The method for producing a steel cord according to claim 8, wherein a region where the Zn comes into direct contact with the Cu is formed in the second plating step.

10. The method for producing a steel cord according to claim 8, wherein, after the second plating step, a heat treatment is performed at a temperature equal to or higher than alloying temperature of the Cu and the Zn to expose a part of the Co on the surface of the plated wire.

11. The method for producing a steel cord according to claim 10, wherein the heat treatment is performed at a temperature equal to or higher than the temperature at which Zn becomes a liquid phase.

12. The method for producing a steel cord according to claim 8, wherein, in the second plating step, the Zn is plated after the Co is plated.

13. The steel cord according to claim 1, wherein at least 95 wt % of the Co present on the outermost surface of the plating being not alloyed.

* * * * *